United States Patent
Schneider

[11] Patent Number: 6,119,861
[45] Date of Patent: Sep. 19, 2000

[54] APPARATUS FOR SUPPORTING PIPES

[75] Inventor: Volkrad W. H. Schneider, Gibraltar, Gibraltar

[73] Assignee: Thread Guard Technology Ltd., Gibraltar

[21] Appl. No.: 08/960,806

[22] Filed: Oct. 30, 1997

[30] Foreign Application Priority Data

Feb. 15, 1997 [DE] Germany .......................... 297 02 638

[51] Int. Cl.[7] .................................................. B65D 85/20
[52] U.S. Cl. .......................... 206/443; 206/821; 206/446; 108/53.1; 108/57.29
[58] Field of Search ................................... 206/443, 446, 206/597, 821; 108/53.1, 57.29

[56] References Cited

U.S. PATENT DOCUMENTS

| | | | |
|---|---|---|---|
| 3,091,348 | 5/1963 | Neuhauser | 206/443 |
| 3,196,229 | 7/1965 | Glass | 206/443 |
| 4,901,870 | 2/1990 | Wright et al. | 206/446 |
| 5,516,244 | 5/1996 | Baka | 206/443 |

FOREIGN PATENT DOCUMENTS

| | | | |
|---|---|---|---|
| 1238112 | 6/1960 | France | 206/446 |
| 0415265B1 | 8/1990 | Germany . | |
| 392820C2 | 12/1991 | Germany . | |
| 7700051 | 11/1977 | Netherlands | 206/443 |
| 2059905 | 4/1981 | United Kingdom | 206/443 |

*Primary Examiner*—Paul T. Sewell
*Assistant Examiner*—Jila Mohandesi
*Attorney, Agent, or Firm*—Jordan and Hamburg LLP

[57] ABSTRACT

Apparatus for supporting pipes during their storage and transport includes pipe holders having an operating position in which the pipe holders are disposed in superimposed spaced relationship. Pipes are disposed in the spaces between the pipe holders, the pipe holders having an upper side and a lower side with the upper and lower sides having opposed spaced apart recesses for accommodating the pipes. A clamping device is provided for clamping the pipe holders and the pipes into a clamped unit.

10 Claims, 2 Drawing Sheets

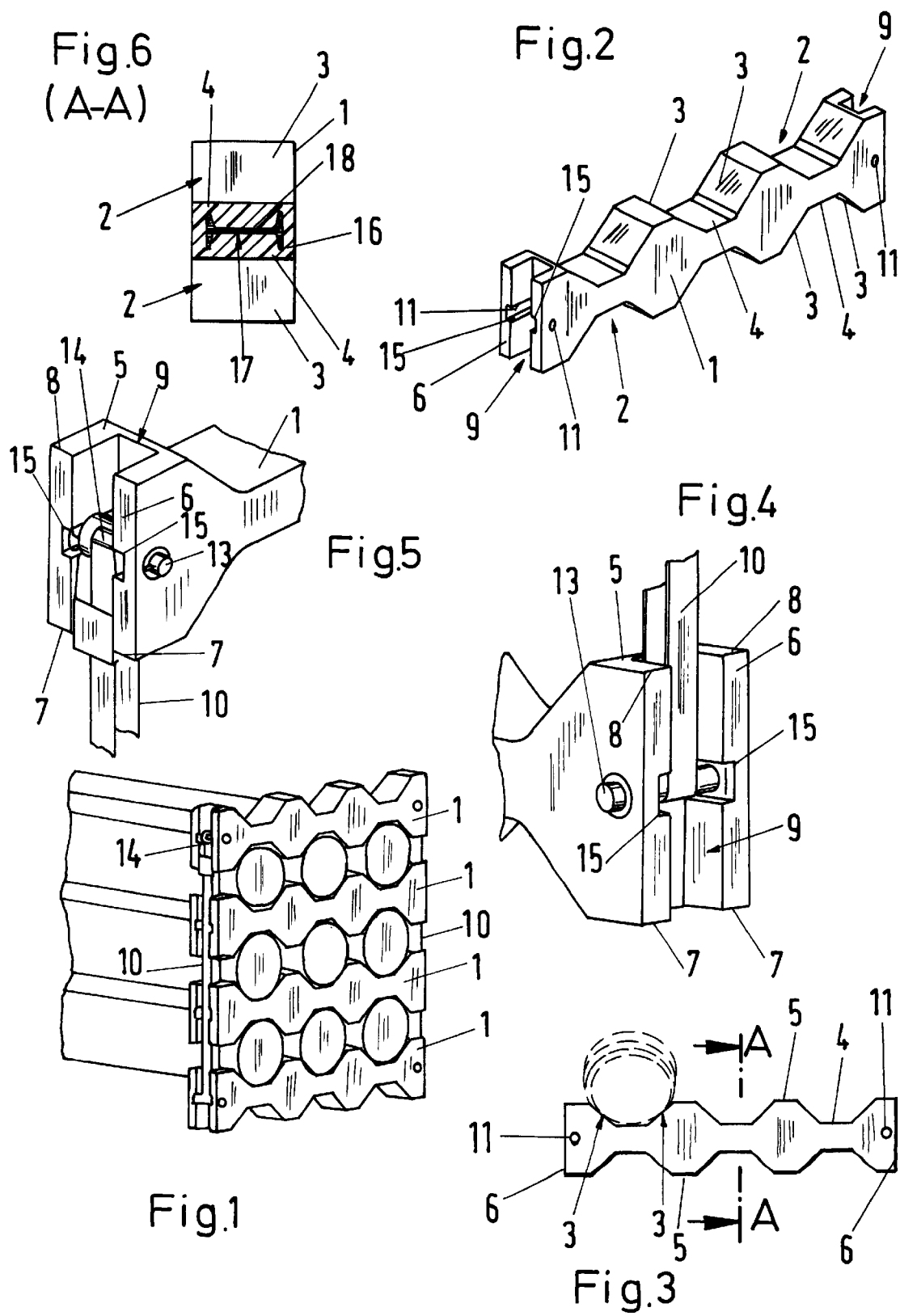

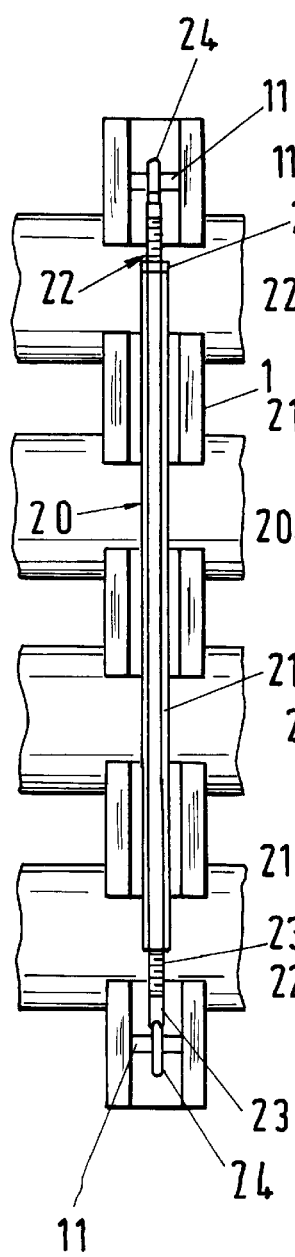
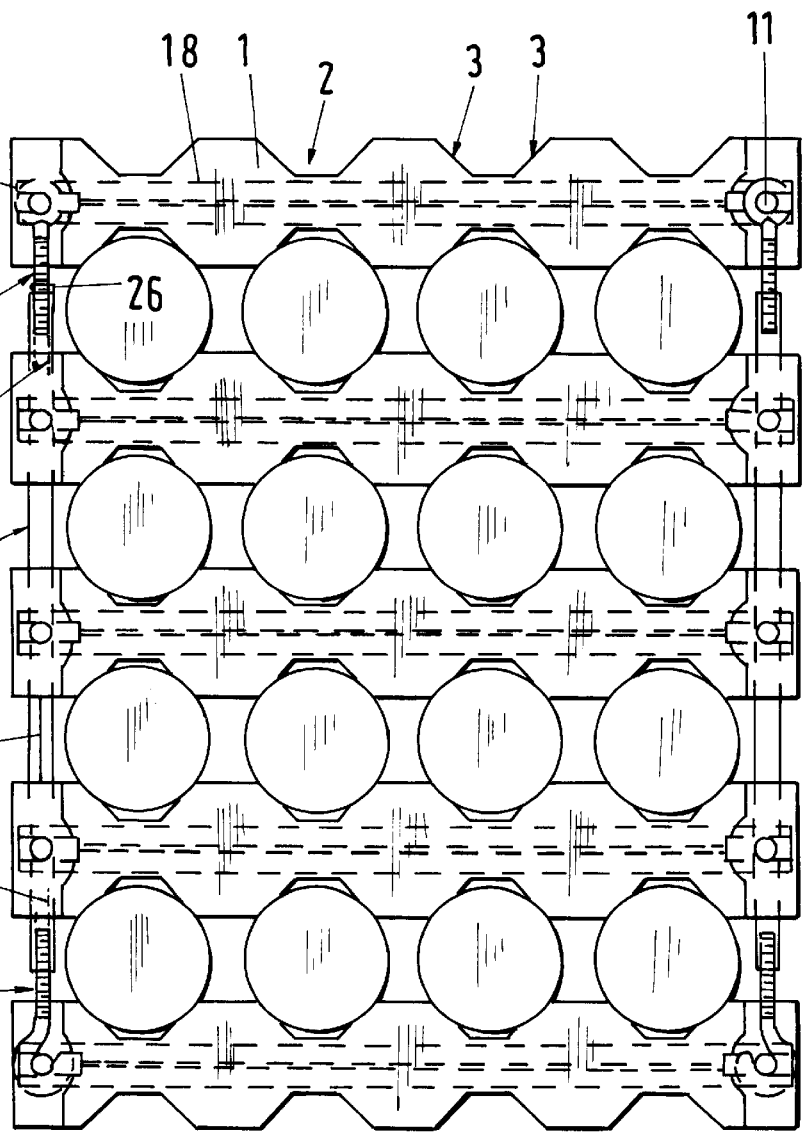

APPARATUS FOR SUPPORTING PIPES

BACKGROUND OF THE INVENTION

The invention relates to an apparatus for supporting pipes during their storage and transport in a specified arrangement next to and on top of one another in layers at a distance from one another, with pipe holders, which, in the operating position, are disposed vertically above one another above and below each layer of pipes and which have on their upper side and underside a number of diametrically opposite, spaced-apart recesses for accommodating pipes and can be clamped together by clamping means into a unit.

Different versions of apparatuses of the aforementioned type are known (DE 39 28 320 C2, EP 0 415 265 B1, U.S. brochure "SIGMA-PAK" of SIGMA-Chemie (U.S.A.) Inc., P.O. Box 90398, Houston, Tex. 77090). For all the known embodiments, the recesses have a partially cylindrical cross sectional shape, the diameter of the partially cylindrical recess corresponding to the diameter of the pipes, which are to be stored and transported. Special apparatuses must therefore be kept for each pipe diameter.

The invention is concerned with the problem of providing a supporting device, which can be manufactured price-effectively, is of light construction, can be manufactured cost-effectively and used universally.

The inventive apparatus can be used for pipes of a broad spectrum of diameters, since pipes, the diameters of which lie within a range of diameters than can be determined by the trapezoidal shape, can be supported securely within the trapezoidal recesses. Moreover, the pipe carriers can be manufactured easily and reasonably priced and clamped together entirely stably and securely by simple means as a unit.

Further details and advantages arise out of the following description and the drawing, in which an example of the object of the invention is shown in greater detail diagrammatically.

IN THE DRAWINGS

FIG. 1 shows a perspective view of an inventive apparatus for accommodating three layers of three pipes each, FIG. 2 shows a perspective detailed representation of a pipe carrier of FIG. 1, FIG. 3 shows a side view of the pipe carrier of FIG. 2 to illustrate the range of pipe diameters that can be accommodated, FIG. 4 shows a view of the right end of the lowest pipe carrier in FIG. 1, FIG. 5 shows a view of the left end of the top pipe carrier in FIG. 1, FIG. 6 shows a section through the pipe carrier along the line A—A in FIG. 3, FIG. 7 shows a front view of an inventive apparatus with screw turnbuckles as locking means and FIG. 8 shows a truncated view of the one-sided end faces of the pipe holders to illustrate a screw turnbuckle.

The supporting device, illustrated in the drawing, comprises pipe holders 1 which, in the operating position, are disposed vertically above one another above and below each layer of pipes and have on the upper side and underside a number of diametrically opposite, mutually spaced-apart recesses 2 for accommodating pipes. In the case of the example shown, each pipe holder 1 has three recesses 2 on the upper side and the underside, so that it is suitable for supporting three pipes within a layer of pipes. It is, however, self evident that the number of recesses can be 2, 4 or more than 4. The number of layers of pipes is also not limited to three; for example, it may be 2, 4 or more than 4.

All the recesses 2 have a trapezoidal cross sectional shape, the outwardly diverging side surfaces 3, between which there is the base surface 4, enclosing an angle of 120E to 150E and preferably of 135E. On the outside, the diverging side surfaces 3 go over into outer surfaces 5 of the pipe holder 1, which are directed parallel to the base surfaces 4 and can be used as a base for the top or bottom pipe holder 1 of a unit.

At the ends, the pipe holder 1 have flat surfaces 6, which are vertical in the operating position and connect in each case outer end edges 7, 8 of the internally adjacent outer surfaces 5. Moreover, the pipe holders 1 are provided at their end surfaces in each case with a groove 9, which is vertical in the operating position and continuous from top to bottom and serves for the passage of means to clamp the intervening pipe holders 1 into a unit.

All end faces of the pipe holder 1 are provided with a continuous, transverse borehole 11, which extends at the level of the horizontal median plane 12 and which is intended to accommodate a transverse connector 13, freely passing through the front groove 9. These transverse connectors 13, visible over split pins, are inserted in the transverse boreholes 11 of the top and bottom pipe holder 1 in a unit. They serve to support the clamping means, which can be constructed as flat belts 10, which can be passed around the transverse connectors 13 and can be clamped by means of a ratchet turnbuckle 14.

For mounting such a ratchet turnbuckle 14, for example, on the transverse connectors 13 of the top pipe holder in a unit, the inner side walls of the groove 9 are provided at the level of the transverse boreholes 11 with an internal groove 15, which is aligned perpendicularly to the end surface 6 of the pipe holder 1 and the width of which is greater than the diameter of the transverse boreholes 11 or of the diameters of the transverse connectors 13, which can be accommodated in these boreholes 11, so that a shoulder of the ratchet turnbuckle 14 can extend into the inner grooves 15. Accordingly, the inner groove 15 can be omitted, if different clamping means are used.

In their central part 16 between the recesses 2 on either side, the pipe holders 1 are provided with a reinforcing insert 17, if they are produced, as is preferred, from a polymeric material. The reinforcing insert 17 preferably consists of a metallic material, such as steel, and is cast or injected into the pipe holder 1. Advantageously, the reinforcing layer 17 consists of an I beam, the center leg 18 of which is disposed parallel to the base surface 4 of the recesses 2 centrally between these, as shown in FIG. 6. The reinforcing insert 17 extends essentially over the whole length of the pipe holder 1; at the ends, however, it is also covered by the material of the pipe holder 1. It occupies a predominant part of the width and height of the central part 16 of the pipe holder 1, as is also shown in FIG. 6. The middle leg 18 of the reinforcing layer 17 is recessed in the regions of the grooves 9 to such an extent, that its end faces are still covered in the region of the grooves 9 by the material of the pipe holder 1.

As polymeric material, a plastic, such as polyethylene, is preferably used which, while having adequate strength, nevertheless offers a certain flexibility and has a Shore hardness D of, for example, 43 to 48, so that, when the pipe holder 1 is clamped, the pipes, accommodated in the recesses 2, make strip-shaped contact and not linear contact with the surfaces 3 or 3 and 4 of the recesses 2.

As can be seen in FIG. 3, the recesses 2 can accommodate and support securely pipes, the diameter of which can differ over a considerable range, it being understood that only pipes of one and the same diameter can be supported in a layer of pipes. The range of diameters, which can be accommodated in each case, depends on the geometry of the trapezoidal recesses, that is, on the slope of the side surfaces 3 and on the mutual distance between the side surfaces 3 at the level of the base surfaces 4. For pipes with a diameter in the intended range, the shape of the recesses 2 ensures everywhere that the pipes lie at least against the side surfaces 3 or the side surfaces 3 and the base surface 4 of each recess 2.

Instead of the flat belt 10 and the ratchet turnbuckle 14, a screw turnbuckle 20, which may consist, for example, of a hollow tension rod 21, which is hexagonal in outer cross section, and two cocking levers 22, may also be provided as clamping means for heavy use cases. The tension rod 21 is provided at its ends with opposite internal threads 21', into which clamping bolts 23 of the cocking levers 22, which are provided with external threads 23', can be screwed. Both cocking levers 22 carry a clamping hook 24, which in each case can be placed upon a transverse connector 11. At least one clamping hook 24 can also be replaced by a lug.

In the operating position shown in FIGS. 7 and 8, clamping is accomplished by turning the tension rod 21 with the help of a wrench applied to the tension rod 21 or with the help of a clamping lever if, for example, the tension rod 21 is provided with an insertion or lead-through opening in the region between the cocking levers 22. In the case of such a construction, the tension rod can have any external cross section, including, for example, also a circular cross section.

All suitable and known means can be used to secure the clamped position of the parts of the screw turnbuckle 20. A particularly simple construction provides that a locking nut 26, which can be screwed in counter-engagement against the adjacent front end of the tension rod 21, is provided on at least one clamping bolt 23.

What is claimed is:

1. Pipe supporting apparatus comprising pipe holders having an operating position in which the pipe holders are disposed in superimposed spaced relationship, said pipe holders being adapted to support pipes in the space between said superimposed pipe holders when said pipe holders are in said operating position, said pipe holders having an upper side and a lower side, said upper and lower sides having spaced apart recesses for accommodating said pipes, said recesses having a generally flat base, said pipe holders having spaced central parts between the recesses, reinforcing means in said central parts, said reinforcing means comprising an I beam having a middle leg, said middle leg being disposed parallel to said flat base of said recess, said middle leg being disposed centrally between the flat bases of said recesses, and clamping means clamping said pipe holders and said pipes into a clamped unit.

2. Pipe supporting apparatus comprising pipe holders having an operating position in which the pipe holders are disposed in superimposed spaced relationship, said pipe holders being adapted to support pipes in the space between said superimposed pipe holders when said pipe holders are in said operating position, said pipe holders having an upper side and a lower side, said upper and lower sides having spaced apart recesses for accommodating said pipes, said pipe holders having spaced central parts between the recesses, reinforcing means in said central parts, clamping means clamping said pipe holders and said pipes into a clamped unit, said pipe holders being elongate pipe holders having longitudinal axes, said pipe holders having longitudinal end portions, grooves in said longitudinal end portions, said grooves having groove axes perpendicular to the longitudinal axis of the respective pipe holder, said groove axes extending vertically when said pipe holders are in said operating position, said longitudinal end portions of said pipe holders having an upper side section and a lower side section, said grooves extending between the respective upper and lower side sections, said longitudinal end portions of the pipe holders including a hole having a hole axis which extends horizontally when said pipe holders are in said operating position, said holes being disposed substantially mid-way between said upper side section and said lower side section, said clamped unit including an upper pipe holder and a lower pipe holder, a transverse connector in the holes of said upper pipe holder and said lower pipe holder, said transverse connector traversing said grooves, said pipe holders having generally flat ends perpendicular to said longitudinal axis, said grooves having internal side walls, an inner channel in said side walls, said inner channels having longitudinal axes extending perpendicular to said flat ends of said pipe holders, said channels having a width greater than the diameter of said holes.

3. Pipe supporting apparatus according to claim 2 wherein said transverse connector extends through said channels.

4. Pipe supporting apparatus comprising pipe holders having an operating position in which the pipe holders are disposed in superimposed spaced relationship, said pipe holders being adapted to support pipes in the space between said superimposed pipe holders when said pipe holders are in said operating position, said pipe holders having an upper side and a lower side, said upper and lower sides having spaced apart recesses for accommodating said pipes, said pipe holders having spaced central parts between the recesses, reinforcing means in said central parts, clamping means clamping said pipe holders and said pipes into a clamped unit, said pipe holders being elongate pipe holders having longitudinal axes, said pipe holders having longitudinal end portions, grooves in said longitudinal end portions, said grooves having groove axes perpendicular to the longitudinal axis of the respective pipe holder, said groove axes extending vertically when said pipe holders are in said operating position, said longitudinal end portions of said pipe holders having an upper side section and a lower side section, said grooves extending between the respective upper and lower side sections, said longitudinal end portions of the pipe holders including a hole having a hole axis which extends horizontally when said pipe holders are in said operating position, said holes being disposed substantially mid-way between said upper side section and said lower side section, said clamped unit including an upper pipe holder and a lower pipe holder, a transverse connector in the holes of said upper pipe holder and said lower pipe holder, said transverse connector traversing said grooves, said clamping means comprising turn buckles which include a tension rod having end portions, said end portions having opposite internal threads, clamp members having external threads threaded to said internal threads of said tension rod, said clamp members having clamp hooks engaging the transverse connectors on said upper and lower pipe holders.

5. Pipe supporting apparatus according to claim 4 wherein said tension rod has at least one section having an external polygonal cross sectional configuration to facilitate turning of said tension rod.

6. Pipe supporting apparatus according to claim 4 wherein said tension rod has at least one section having an external hexagonal cross sectional configuration.

7. Pipe supporting apparatus according to claim 4 wherein said clamping means further includes a clamping nut engaging the external threads on said tension rod, said clamping nut having an operating position in which the clamping nut engages the end of the tension rod.

8. Pipe supporting apparatus comprising pipe holders having an operating position in which the pipe holders are disposed in superimposed spaced relationship, said pipe holders being adapted to support pipes in the space between said superimposed pipe holders when said pipe holders are in said operating position, said pipe holders having an upper side and a lower side, said upper and lower sides having spaced apart recesses for accommodating said pipes, clamping means clamping said pipe holders and said pipes into a clamped unit, said pipe holders being elongate pipe holders having longitudinal axes, said pipe holders having longitudinal end portions, grooves in said longitudinal end portions, said longitudinal end portions including a hole having a hole axis which extends horizontally when said pipe holders are in said operating position, said pipe holders having generally flat ends perpendicular to said longitudinal axes, said grooves having internal side walls, an inner channel in said side walls, said inner channels having longitudinal axes extending perpendicular to said flat ends of said pipe holders, said channels having a width greater than the diameter of said holes.

9. Pipe supporting apparatus comprising pipe holders having an operating position in which the pipe holders are disposed in superimposed spaced relationship, said pipe holders being adapted to support pipes in the space between said superimposed pipe holders when said pipe holders are in said operating position, said pipe holders having an upper side and a lower side, said upper and lower sides having spaced apart recesses for accommodating said pipes, clamping means clamping said pipe holders and said pipes into a clamped unit, said pipe holders being elongate pipe holders having longitudinal axes, said pipe holders having longitudinal end portions, grooves in said longitudinal end portions, said longitudinal end portions including a hole having a hole axis which extends horizontally when said pipe holders are in said operating position, said clamped unit including an upper pipe holder and a lower pipe holder, a transverse connector in the holes of said upper pipe holder and said lower pipe holder, said transverse connector traversing said grooves in said upper pipe holder and said lower pipe holder, said clamping means comprising turn buckles which include a tension rod having end portions, said end portions having opposite internal threads, clamp members having external threads threaded to said internal threads of said tension rod, said clamp members having clamp hooks engaging the transverse connectors on said upper and lower pipe holders.

10. Pipe supporting apparatus comprising pipe holders having a pipe-supporting position in which the pipe holders are disposed in superimposed spaced relationship, said pipe holders being adapted to support pipes in the space between said superimposed pipe holders when said pipe holders are in said pipe-supporting position, said pipe holders having an upper side and a lower side, said upper side of a first pipe holder having a plurality of spaced first recesses, said lower side of a second pipe holder having a plurality of spaced second recesses, the plurality of first recesses of said first pipe holder being in superimposed relationship with the plurality of second recesses of said second pipe holder so as to form a plurality of pairs of superimposed recesses in which each of said pairs of superimposed recesses define a pipe receiving space for receiving a pipe, the side walls of said first recesses and the side walls of the second recesses of each pair being in contact with a pipe received in said pipe receiving space when said pipe holders are in said pipe-supporting position, clamping means clamping said pipe holders in said pipe-supporting position, the upper side of said second pipe holder having a plurality of spaced third recesses, the lower side of a third piper holder having a plurality of spaced fourth recesses, the plurality of fourth recesses of said third pipe holder being in superimposed relationship with the plurality of third recesses of said second pipe holder so as to form a plurality of second pairs of superimposed recesses in which each of said second pairs of recesses define a second pipe receiving space for receiving a pipe, the side walls of said third recesses and the side walls of said fourth recesses of each respective second pair being in contact with a pipe received in said second receiving space when said pipe holders are in said pipe-supporting position, the space between said first and second pipe holders being different from the spacing between said second and third pipe holders such that the size of the first said pipe spaces differs from the size of said second pipe spaces.

* * * * *